April 13, 1965  L. HORN ET AL  3,178,314
COMPRESSED ELECTRODE ASSEMBLY AND PROCESS FOR MAKING THE SAME
Filed Sept. 13, 1960  2 Sheets-Sheet 1

INVENTORS
LUTZ HORN
FRITZ PHILIPP
BY
ATTORNEYS

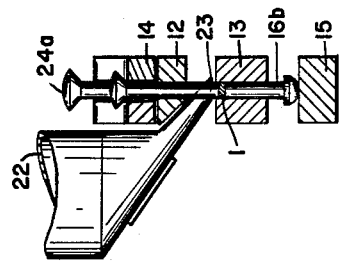
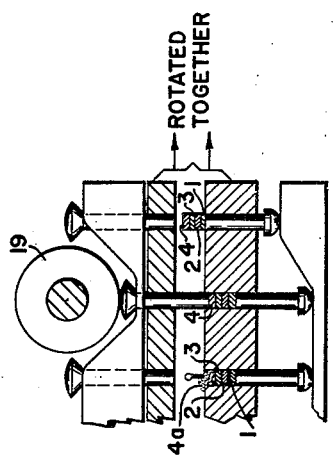
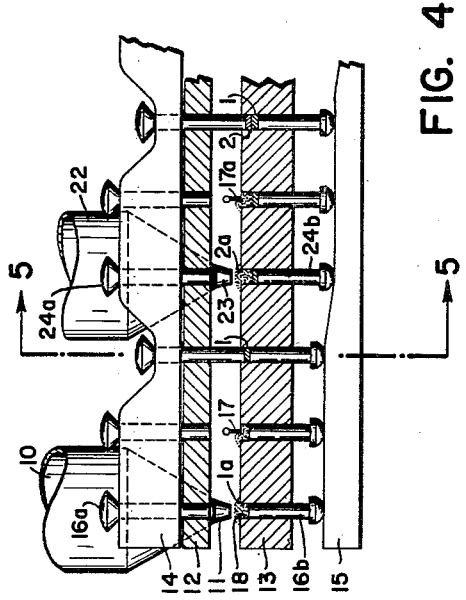

United States Patent Office 3,178,314
Patented Apr. 13, 1965

3,178,314
COMPRESSED ELECTRODE ASSEMBLY AND
PROCESS FOR MAKING THE SAME
Lutz Horn, Hagen, and Fritz Philipp, Hagen-Haspe, Germany, assignors to Varta Aktiengesellschaft
Filed Sept. 13, 1960, Ser. No. 55,680
Claims priority, application Germany, Sept. 18, 1959,
A 32,882
9 Claims. (Cl. 136—21)

This invention relates to pressure-compacted electrode assemblies for battery cells, produced from pulverulent or granular active substances or both, as well well as to a process for the manufacture of such electrodes.

Pressure-compacted electrodes produced from pulverulent active substances for alkaline storage batteries, in which the separator consists of a non-conductive nickel hydroxide layer and retains its non-conductive character during its formation, are known. According to known processes it is necessary to prepare the individual electrodes and separators separately and to consolidate them by fabric or similar supporting material before they can be pressed together to form a unitary electrode assembly. The manufacture of any such pressure- compacted and compound electrodes is very time-consuming and results in products having only approximately constant mechanical and electro-chemical properties.

Thus, the problem arose to produce a pressure-compacted electrode assembly which does not have these disadvantages and can be readily manufactured.

In one solution of this problem, the active substances and the separator, each originally present in the form of a powder, or a granular mass, or both, are compacted layerwise along the surfaces of contact or interfaces of the layers. Electrode assemblies produced in this manner are adapted to be used not only for alkaline storage batteries, but can also be used for storage batteries with acid electrolytes.

Electrode structures obtainable in accordance with the invention and means for practicing the process for manufacturing them are shown in the accompanying drawings, in which:

FIG. 4 is a diagrammatic representation of a multiple-layer press suitable for making electrodes according to the process of the invention; and FIG. 5 is a sectional view taken through line 5—5 of FIG. 4.

Figure 2:
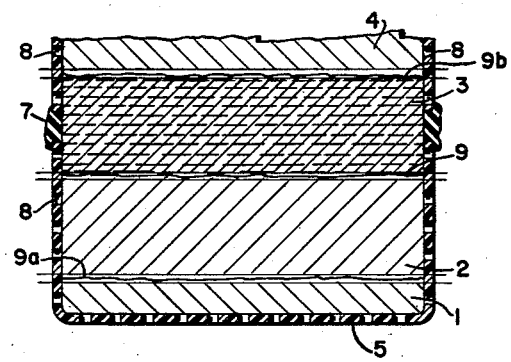
FIG. 2 is a greatly enlarged cross-section through part of an alternative electrode assembly.

As shown more clearly in FIG. 2, the electrode assembly has the advantage that the boundary faces 9, 9a, 9b of the separate layers comprising the antipolar mass 1, the positive active mass 2, the separator 3, and the negative active mass 4, shown in this section, are interlinked together. The depth of the interlinking portions is in part dependent upon the diameters of the particles constituting the individual layers. In any case, however, this relative disposition results in considerable enlargement of the thickness of the boundary between the solid layers (as compared to prior practice), in such a way that, as can be seen in FIG. 2, these boundaries become bonding regions between the separate layers which extend substantially parallel to each other.

Figure 1:
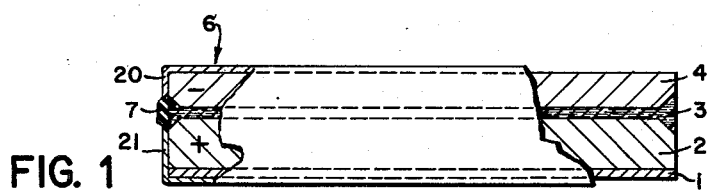
FIG. 1 is a longitudinal section of a cylindrical pressure-consolidated electrode assembly formed in accordance with the present invention.

In FIGS. 1 and 2, the electrode assembly of the present invention is shown, in a preferred form of construction, to be composed of four interlinked and bonded layers, disposed one on top of the other in the sequence: antipolar mass 1, positive active mass 2, separator 3, and negative active mass 4. Mass 1 is a relatively large-area layer of material such as cadmium oxide having a polarity opposed to that of the positive electrode. The antipolar material prevents the evolution of oxygen upon polarity reversal and inhibits hydrogen evolution. The positive active mass 2 may be formed of nickel hydroxide, the separator 3 of a metallic oxide such as aluminum oxide or barium oxide and the negative active mass 4 may be formed of cadmium oxide. It will be understood that arrangements are also possible in which two or more each of positive and negative electrodes, 2 and 4, are similarly assembled alternately in a single compact.

Figure 3:
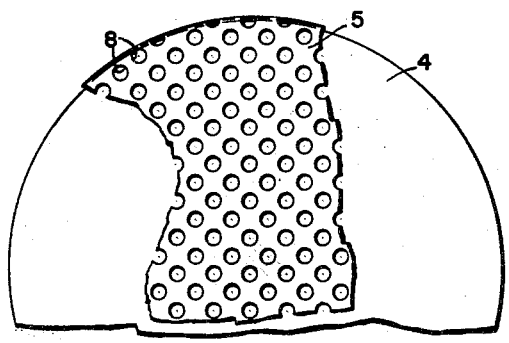
FIG. 3 shows a piece of the perforated casing of the electrode assembly of FIG 2.

FIGS. 2 and 3 show the manner in which the casing 5, consisting of two half shells of perforated insulating material, is arranged around the electrode assembly, and the appearance of its surface. The casing 5 serves to protect the electrode compact from mechanical injury and to give it a shape suited to its final use and location. The half shells are spaced at their juncture approximately 1 mm. apart and the interspace is filled with a plastic material 7 as shown.

FIG. 1 shows a non-perforated electrically conductive casing employed on an electrode assembly embodying four layers. In this instance, the casing is pre-formed of metal in two parts comprising shells 20 and 21, the edges of which, in enclosing the electrode assembly, are accurately placed over the separating layer 3, without coming into contact with each other, and are mechanically joined together only by means of an electrically insulating material 7 which preferably is of a hard synthetic plastic such as an epoxy resin or an unsaturated polyester resin. "Araldit," manufactured by Ciba, and "Palatal," manufactured by Badische Anilin- and Soda-Fabrik AG are examples of synthetic plastics that have been used satisfactorily in this application. When the layers 1, 2, 3 and 4 are all relatively thin it is advisable to flare the edges of the separator layer 3, as shown in FIG. 1, to thicken the periphery of the separator layer in order to prevent the adjacent edges of the casing shells 20, 21 from touching each other. The width of the gap between the two shells is made sufficiently great, preferably about 1 mm., to ensure a reliable separation of these oppositely polarized shells. The half shells may be made of perforated sheet metal or nickel wire mesh if desired.

The grain size of the materials needed for the formation of the separate layers 1–4 depends on the size of the electrode assembly and of its separate layers, to the extent that the diameter of each individual particle must be smaller by at least one sixth the thickness of the respective layers. Accordingly, the electrode assemblies having thick layers, particles with a greater diameter can be used. The particle sizes of the various layers may differ according to the active masses or mixtures thereof which are employed in the cell. For the negative mass, the particle size ranges from 40 microns to about 65 microns, and for the positive mass, composed of nickel hydroxide and a conductive material, the particle size ranges from about 20 microns to 60 microns. The particle size of the non-conductive porous separating layer is between 15 and 25 microns. The grain size in the latter layer is advantageously selected to be about 18 microns so that operational migration of particles from layers of opposite polarity is prevented. When the various layers of material are pressed together to form a composite cell, there occurs on each boundary layer a reciprocal interlinking of particles of a dendritic structure. In the appended claims, the term "pulverulent" is used generically in respect to particle size. The nature of the materials and the particle sizes of which the electrode and separating layers are formed are such that even after the compacting step is completed, the layers remain sufficiently porous to absorb a liquid electrolyte. Electrolytes suitable for use with the electrode materials herein specified, are well known in the art.

Regardless of the overall size of the electrode assemblies, it has been found advisable in view of the volume changes which usually accompany electro-chemical phenomena, to add to the active mass a thermo-plastic, electrolyte-resisting synthetic plastic material in a pulverulent or granular form. Either an epoxy resin or an unsaturated polyester resin such as referred to above is satisfactory. In this case, the electrode assembly, having been subjected to the finishing pressure-compaction, is heated a short time to temperatures at which the synthetic plastic, admixed with the active mass in amounts of 2% to 40% by volume, preferably 5% to 15% by volume, begins to soften. Such sintered layers of the active material permanently resist electro-chemical stresses imposed upon them without affecting the electro-chemical functions imposed by the electrolyte absorbed therein.

In practicing the process of this invention for the production of the described electrode assembly, the machine schematically represented in FIGS. 4 and 5 has been found to be particularly useful. This machine is actually circular in form, but to simplify the drawing it is shown as rolled-out or rectilinear. It includes a circular carrier comprising an upper wheel 12 and a lower wheel 13. These two carrier wheels are rigidly coupled together, as on a single vertical shaft or the equivalent, so that they rotate toward the right in a horizontal plane as a single unit when suitably driven. The upper wheel carries a number of upper plungers such as 16a and 24a, and the lower wheel carries a like number of plungers such as 16b and 24b, which are vertically aligned in pairs. The lower shell 13 is thicker than the upper to provide a charging cavity 18 which is formed when the lower plunger is depressed. A lower stationary cam 15 presses against the tops of the heads of the lower plungers and determines their vertical positions in the wheel 13. Similarly, an upper stationary cam 14 bears on the under surfaces of the enlarged heads of the upper plungers and determines their vertical positions in the wheel 12. The upper cam is constructed in two parallel sections spaced apart, as seen in FIG. 5, to permit the upper plungers to pass between them as they are moved along by carrier wheel 12. Both cams are removable and replaceable by cams of any desired shapes. The weight of the upper plungers will usually compress a single layer sufficiently in each stage. Much greater pressure to form the final self-supporting compact is provided by suitable, adjustable pressure rollers such as 19, seen at the right in FIG. 4. The cam surface must, of course, be shaped to permit the head of the plunger to descend under the roller and to lift again, as shown.

The machine above described can readily be modified to form a large variety of compacted units or assemblies of units, by changing the number of charging stations, the cross-sectional shape and length of the plungers, the design of the cams, etc. This machine will now be referred to in describing the process of the present invention for making the mentioned compacted electrode assemblies for storage battery cells and the like. This process is as follows:

The powdered or granulated material required for the formation of layer 1 is loaded into the feed hopper 10 of the first station, and flows, as at 1a, from the spout 11 into the charging cavity 18 in carrier wheel 13. This cavity is here assumed to be of round cross-section, but may have any desired shape. It is limited in depth by the position of the top face of lower plunger 16b, which, in turn, can be adjusted by the height of cam 15 at this point. This determines the amount of material which will form the layer. The desired quantity of material to form this layer can be roughly controlled by a well-known gate in the feed, but it is more exactly determined by scraper 17 which scrapes off the excess as cavity 18 moves beneath it. When cavity 18 reaches the 3rd position, the upper plunger drops gently down, compacting the material 1a to form compacted layer 1 of required thickness. As the carrier continues to move toward the right, the upper plunger (here marked 24a) is lifted as shown in the 4th position.

At the second station, the material for the positive electrode flows from hopper 22 through funnel 23 into the cavity above layer 1 formed by further lowering the lower plunger (24b) by the correct distance. After passing scraper 17a, this material 2a is compacted by the falling of the upper plunger seen in the 6th position, forming layer 2. At the third station, not shown, corresponding steps form the layer 3 comprising the separator layer.

At the fourth station the material to form the negative electrode flows into the cavity, again formed by a further lowering of the lower plunger. At the 7th position from the left, as seen in the drawing, the excess of material 4a is scraped off and the cavity with its contents moves to the 8th position where the roller 19 presses on the top of the upper plunger to apply the required compression to the entire assembly. In the final position, the upper plunger is raised by cam 14 and the lower plunger is raised by cam 15 so as to eject the compacted assembly from the cavity, where a deflector (not shown) moves it aside. This completes the process of forming one electrode assembly, but meanwhile, these same positions are forming the assemblies which follow, thus making the process continuous.

By an appropriate choice of the shape of the cams 14, 15 it is possible simultaneously to determine the thickness of each separate layer, as well as the magnitude of the final compacting pressure. The external configuration of the electrode asembly is determined by the shapes of the plungers and by the formation of the corresponding recesses in the carriers 12 and 13. If the pairs of plungers are of different shapes, products differently shaped can be made simultaneously.

By repeating this entire sequence comprising, in succession, the operations of filling, levelling-off, preliminary light compaction and final high-pressure compaction, it is possible to achieve the interlinking of the component layers which is extremely advantageous for operation in a storage battery. Additionally, the process has the great advantage of making unnecessary the manufacture of the separator as a separate operation, and subsequently inserting it. Furthermore, the separate armoring of each electrode, formerly required, is no longer necessary.

The particular degree to which the layers are preliminarily compacted is not of critical importance. The preliminary compaction of the layers should be such that the resulting electrode assembly can be subjected to the final high-pressure compaction step to form distinct layers of active and inactive compacted material. Thus, as would be understood by those skilled in the art, the layers should be partially compacted at least to the extent that the forming of each layer of the assembly will not substantially disrupt the continuity of any of the preceding layers.

In order to provide the stability of the electrode assembly necessary for handling it and further working on it, the assembly having been subjected to the final pressure compaction, may be packed in a suitable perforated material conforming to the required external dimensions of the assembly. In that way it is possible to subject the electrode assembly, having thus been armored, once more to a pressure compaction, in order to make sure that, in case an electrically conductive armoring material is used, the two shells can serve, after the assembly has been soaked in suitable electrolyte, as advantageous lead-offs for both the negative and the positive electrodes, as shown in FIG. 1.

The new method of forming the separator during the building up of the electrode assembly, made possible for the first time by this process, has the great advantage of interlocking the separator with the electrode-forming materials without loss of any of the insulating characteristics of the separator.

By the process of the invention the production of pressure-consolidated, built-up electrodes is considerably simplified; and the beneficial effects become especially apparent in the large-scale manufacture of small units. Also, the quality of the electrode assemblies produced in this manner exceeds, by far, that of assemblies composed of separate parts separately compacted by pressure into individual layer units which must later be assembled.

We claim:

1. In a flat-type storage cell having successive stacked layers of material comprising an electrode assembly arranged in columnar form, the improvement comprising at least two electrode layers of compacted active dendritic pulverulent material disposed one over the other, and a separator layer of compacted inactive dendritic pulverulent material interposed between the respective electrode layers, all of said electrode and separator layers being compacted together into an integral self-supporting unit having bonding regions at the interfaces between the layers, said bonding regions comprising intermixed dendritic pulverulent materials from the respective adjoining layers.

2. A flat-type storage cell according to claim 1, characterized in that the active material of each electrode is admixed with an electrolyte-resisting thermoplastic material, said thermo-plastic material being present in an amount between 2% and 40% by volume based upon the mixture.

3. A flat-type storage cell according to claim 2, characterized in that a perforated casing of electrical insulating material encloses said self-supporting unit.

4. A flat-type storage cell according to claim 1, in which there are two electrode layers, one of said electrode layers being a positive active layer and the other being a negative active layer, said cell further comprising an additional layer of pulverulent dendritic porous anti-polar reducible oxide disposed adjacent the surface of the positive active layer opposite to the separator layer, the bonding region between said positive active layer and said anti-polar layer comprising inter-mixed particles of materials from the positive active and anti-polar layers, respectively, all of said layers and bonding regions together constituting a firm, self-supporting unit.

5. A flat-type storage cell according to claim 4, including a casing comprising two electrically insulated metallic shells closely fitting the assembly, one shell covering and being electrically connected to the negative electrode layer, and the other shell covering and being electrically connected to the anti-polar layer and the positive electrode layer, the edges of said shells being spaced apart around the periphery of said separator layer, said cell further including a bond of hardened insulating material connecting the separator edges of said shells.

6. A flat-type storage cell according to claim 5, in which the metallic shells are finely perforated.

7. A flat-type storage cell according to claim 4, in which the positive active layer electrode is formed of nickel hydroxide, the negative active layer electrode is formed of cadmium oxide, the separator layer is formed of a porous metallic oxide having poor electrical conductivity selected from the group consisting of aluminum oxide and barium oxide, and the anti-polar layer is formed of cadmium oxide.

8. In a process for making storage battery electrode assemblies of flat, columnar construction, comprising positive and negative electrode layers of compacted active dendritic pulverulent material and a separator layer of compacted inactive dendritic pulverulent material, the improvement comprising the steps of:

(a) forming a first active partially compacted electrode layer of dendritic pulverulent material;

(b) depositing on top of said first layer a separator layer of inactive dendritic pulverulent material;

(c) partially compacting both said layers together such that the dendritic materials of said layers inter-mix to form a discrete inter-mixed bonding region between said layers;

(d) depositing on top of said separator layer a second electrode layer of active dendritic pulverulent material;

(e) partially compacting said separator layer and said second electrode layer such that the dendritic pulverulent materials of said last-mentioned two layers inter-mix to form a discrete inter-mixed bonding region therebetween; and (f) subjecting all three said layers to a compression force sufficient to form a firm, self-supporting electrode assembly.

9. In a process for making storage battery electrode assemblies of flat, columnar construction comprising a dendritic pulverulent porous anti-polar reducible oxide layer, positive and negative electrode layers of compacted active dendritic pulverulent material and a separator layer of compacted inactive dendritic pulverulent material between said electrode layers, the improvement comprising the steps of:

(a) forming a layer of dendritic pulverulent porous anti-polar reducible oxide;

(b) depositing on top of said layer a first electrode layer of active dendritic pulverulent material;

(c) partially compacting both said layers together such that the dendritic materials of said layers inter-mix to form a discrete inter-mixed bonding region between said layers;

(d) depositing on top of said electrode layer a separator layer of inactive dendritic pulverulent material;

(e) partially compacting both said separator layer and said first electrode layer together such that the dendritic materials thereof inter-mix to form a discrete inter-mixed bonding region therebetween;

(f) depositing on top of said separator layer a second electrode layer of active dendritic pulverulent material;

(g) partially compacting said separator layer and said second electrode layer such that the dendritic materials thereof inter-mix to form a discrete inter-mixed bonding region therebetween; and (h) subjecting all said layers to a compression force sufficient to form a firm, self-supporting assembly.

References Cited by the Examiner

UNITED STATES PATENTS

| | | | |
|---|---|---|---|
| 1,248,571 | 12/17 | Stokes | 107—1 |
| 2,526,591 | 10/50 | Szper | 136—146.7 |
| 2,677,006 | 4/54 | Ameln | 136—28 |
| 2,718,539 | 9/55 | Bradshaw et al. | 136—83 |
| 2,824,165 | 2/58 | Marsal | 136—122 |
| 2,832,813 | 4/58 | Peters | 136—24 |
| 2,852,591 | 9/58 | Ruben | 136—87 |
| 2,879,724 | 3/59 | Wyatt et al. | 107—1 |
| 2,894,053 | 7/59 | Louzos | 136—87 |
| 2,912,479 | 11/59 | Poole | 136—146 |
| 2,928,889 | 3/60 | Bonner et al. | 136—28 |
| 2,980,747 | 4/61 | Daley | 136—28 |
| 2,988,585 | 6/61 | Peters | 136—28 |
| 2,994,729 | 8/61 | Salomon et al. | 136—24 |
| 3,071,638 | 1/63 | Clark et al. | 136—125 |

FOREIGN PATENTS 751,725   7/56   Great Britain.

OTHER REFERENCES

Horne et al.: RCA Technical Note No. 304, November 1959, page 1.

JOHN H. MACK, Primary Examiner.

JOHN R. SPECK, MURRAY TILLMAN, Examiners.